(12) United States Patent
Aschenbrenner

(10) Patent No.: US 7,299,310 B2
(45) Date of Patent: Nov. 20, 2007

(54) CONNECTION MODULE FOR THE CONNECTION OF A SENSOR TO A FIELDBUS

(75) Inventor: Johannes Aschenbrenner, Emmendingen (DE)

(73) Assignee: Sick AG, Waldkirch (DE)

( * ) Notice: Subject to any disclaimer, the term of this patent is extended or adjusted under 35 U.S.C. 154(b) by 602 days.

(21) Appl. No.: 10/986,556

(22) Filed: Nov. 10, 2004

(65) Prior Publication Data

US 2005/0108442 A1 May 19, 2005

(30) Foreign Application Priority Data

Nov. 14, 2003 (DE) ............... 103 53 345

(51) Int. Cl.
*G06F 13/12* (2006.01)
(52) U.S. Cl. ..................... 710/71; 710/305
(58) Field of Classification Search .......... 710/69, 710/70, 71
See application file for complete search history.

(56) References Cited

U.S. PATENT DOCUMENTS

| | | | |
|---|---|---|---|
| 6,571,132 B1 * | 5/2003 | Davis et al. ............... | 700/2 |
| 6,889,282 B2 * | 5/2005 | Schollenberger ......... | 710/305 |
| 7,024,508 B2 * | 4/2006 | Gros et al. ............... | 710/305 |
| 2003/0040881 A1 | 2/2003 | Steger | |
| 2004/0015630 A1 * | 1/2004 | Boolos et al. ............ | 710/300 |
| 2004/0139265 A1 * | 7/2004 | Hocker et al. ............ | 710/305 |

FOREIGN PATENT DOCUMENTS

| | | |
|---|---|---|
| DE | 196 46 219 | 12/1997 |
| DE | 299 07 909 | 8/1999 |
| DE | 299 03 260 | 5/2000 |
| DE | 101 31 094 | 1/2003 |
| DE | 102 23 724 | 1/2003 |
| DE | 101 61 401 | 6/2003 |
| WO | WO 03/054573 | 7/2003 |

\* cited by examiner

*Primary Examiner*—Alford Kindred
*Assistant Examiner*—Ernest Unelus
(74) *Attorney, Agent, or Firm*—Harness, Dickey & Pierce, P.L.C.

(57) ABSTRACT

The invention relates to a connection module for the connection of a sensor, in particular of an optoelectronic sensor, to a fieldbus, comprising a sensor interface for the connection of the connection module to an interface of a sensor, a serial bus interface for the connection of the connection module to an interface of a fieldbus and a gateway circuit which is connected to the bus interface and to the sensor interface in order to convert data received at the bus interface into a data format of a connected sensor and vice versa. The sensor interface of the connection module is made as a parallel interface. At least one I/O circuit is integrated into the connection module and is connected to the bus interface and to the sensor interface. The invention further relates to a method for the connection of a sensor to a fieldbus via a connection module.

21 Claims, 1 Drawing Sheet

CONNECTION MODULE FOR THE CONNECTION OF A SENSOR TO A FIELDBUS

FIELD OF THE INVENTION

The invention relates to a connection module for the connection of a sensor, in particular of an optoelectronic sensor, to a fieldbus, comprising a sensor interface for the connection of the connection module to an interface of a sensor, a serial bus interface for the connection of the connection module to an interface of a fieldbus and a gateway circuit which is connected to the bus interface and to the sensor interface in order to convert data received at the bus interface into a data format of a connected sensor and to output them at the sensor interface and to convert data received at the sensor interface into a data format of the fieldbus and to output them at the bus interface.

BACKGROUND OF THE INVENTION

The background of the invention is the networking of sensors, for example of one-dimensional or two-dimensional optical code readers or of laser measuring systems, via a digital fieldbus, for example of the type Profibus or DeviceNet. It is known for this purpose to provide the sensors with their own fieldbus interface which permits a connection of the sensor to the fieldbus and communication between the sensor and the fieldbus. A fieldbus interface integrated in the sensor, however, makes the actual sensor module undesirably expensive and undesirably voluminous for some applications. The relevant sensor is moreover admittedly adapted to a specific fieldbus; but the sensor can no longer easily be used for other fieldbus types.

Alternatively to its own fieldbus sensor, it is known to provide the relevant sensor with a connection module which has a sensor interface which permits a connection to a serial interface of the sensor. The connection module is connected to a so-called gateway circuit which translates the data exchanged at the sensor interface of the connection module into the format of the fieldbus and vice versa and which is connected for this purpose via a bus interface to the fieldbus. The connection module and the gateway circuit thus serve for the adaptation of both the hardware (respective interface) and the data formats (bus protocol) between the fieldbus and the sensor, with the gateway circuit usually adapting a serial sensor interface to a specific fieldbus type. To configure the sensor for the fieldbus and to permit communication with the fieldbus, the user must parameterize two devices, namely the sensor and the interposed gateway circuit.

Known connection modules have proven to be insufficient, in particular with optoelectronic sensors, since these have digital switch inputs and outputs in addition to a serial data interface and since additional circuits are therefore required to bring about the desired adaptation to a specific fieldbus. With the known connection modules, the parameterization, i.e. the adaptation of the gateway circuit to the fieldbus addressing and the fieldbus protocol is moreover undesirably complex since two devices (sensor and gateway circuit) have to be addressed.

SUMMARY OF THE INVENTION

It is therefore an object of the invention to facilitate the embedding and the replacement of connection modules and sensors in a sensor network connected via a fieldbus.

This object is satisfied by a connection module having the features of claim 1 and in particular in that the sensor interface is made as a parallel interface with a serial data interface and at least one separate switch input/output parallel to it; and in that an I/O circuit, which is connected to the bus interface and to the sensor interface, is integrated into the connection module in order to convert switching data received serially at the bus interface into switching signals and to output them at the parallel switch input/output of the sensor interface and in order to convert switching signals received in parallel manner at the switch input/output into switching data and to output them at the bus interface.

This connection module is therefore characterized in that the sensor interface is made as a parallel interface which has, in addition to the usual serial data interface, at least one parallel switch input and/or output parallel thereto. The connection module is furthermore provided with a so-called I/O circuit. This translates switching data which are contained in the serial data word (string) received at the bus interface of the connection module into digital switching signals which can be transmitted directly to a connected sensor via the parallel switch input/output. In the reverse direction, the I/O circuit integrated into the connection module also provides a conversion of digital switching signals received by a connected sensor at the parallel switch input/output of the sensor interface into a data word which can be output at the (single) serial bus interface together with the sensor data received at the serial data interface. The gateway circuit likewise included in the connection module provides the required conversion of the serial sensor data which are exchanged between the bus interface and the serial data interface of the sensor interface.

Since the connection module is fitted with one or more additional parallel switch inputs/outputs and since at least one I/O circuit is integrated into the connection module, the necessity of separate I/O modules which have to be connected, parallel to a conventional connection module, to the digital switch inputs/outputs of the sensor, on the one hand, and to the fieldbus via its own fieldbus interface, on the other hand, is dispensed with. The necessity is furthermore dispensed with of configuring such additional I/O modules for the specifically used fieldbus. In accordance with the invention, the sensor is therefore connected to the fieldbus via one single connection module with an integrated gateway circuit and an integrated I/O circuit. The switching signals of the sensor can in this manner be taken directly into account and used in the process mapping of the control so that the control of the switch inputs/outputs of the sensor are considerably simplified.

The device effort is substantially reduced since only one single connection module is required to connect the respective sensor to the fieldbus even if the sensor has one or more switch inputs/outputs, as is typically the case with optoelectronic sensors.

Since the I/O circuit is integrated into the connection module, a connection between the switch inputs/outputs of the sensor and the I/O circuit is possible especially easily via very short leads.

Any required replacement of the connection module or of the connected sensor is also possible in a simple manner since no additional separate I/O modules have to be taken into account for the parameterization required for this purpose of the replaced device.

In accordance with an advantageous embodiment of the connection module, the at least one I/O circuit is integrated into the gateway circuit, i.e. the I/O circuit is part of the gateway circuit. In this case, the necessity is even dispensed with of making the I/O circuit as a separate circuit unit or circuit board; the conversion of the serial switching data into parallel switching signals—and vice versa—rather takes place by a common gateway-I/O circuit. The connection of the I/O circuit to the bus interface and to the sensor case takes place in this case via the actual gateway circuit.

It is furthermore of advantage for the gateway circuit to be made as a unit which can be replaced by the user, in particular as a card (insertion card) which can additionally be secured by screws. A unit which replaceable by the user is generally to be understood in connection with the invention as a unit which can be replaced either without tools or with a simple tool (such as a screwdriver, for example), and in any case without solder processes. A separate I/O circuit or a combined gateway-I/O circuit can also be made as a unit replaceable by the user. In these cases, the connection module can be adapted particularly flexibly to different fieldbus types due to the modular design. In the event of a defect in the respective circuit, this can be replaced particularly simply without the whole connection module having to be replaced.

It is furthermore preferred for the sensor interface, the bus interface, the gateway circuit and the I/O circuit of the connection module to be accommodated in a common housing.

In accordance with an advantageous embodiment, a permanent memory is furthermore integrated into the connection module for the storage of operating parameters and the gateway circuit and the I/O circuit can communicate with the fieldbus on the basis thereof. Thanks to such a permanent memory, the required operating parameters, for example the identification number of the connected sensor within the network, the data length to be used or the baud rate to be used always remain in memory as long as the stored parameters are not directly overwritten again. The operating parameters are thereby maintained even if the system is switched off for a time or if the associated sensor is replaced.

It is preferred for the said permanent memory also to be made as a unit replaceable by the user, for example as a replaceable memory card. In this case, for example, the connection module with an associated gateway circuit and/or an I/O circuit can be replaced, with the operating parameters required for the communication with the fieldbus being maintained in a simple manner in that the permanent memory is taken out of the replaced connection module and inserted into the new connection module.

The permanent memory is preferably provided with its own micro-controller which permits a direct data exchange of the permanent memory with the serial data interface of the connection module. Alternatively to this, the permanent memory can also be directly connected to the gateway circuit and to the I/O circuit.

In accordance with an advantageous further development, the gateway circuit and the I/O circuit are configured such that the operating parameters to be used for the communication with the fieldbus can be transmitted to the gateway circuit and to the I/O circuit via the sensor interface from a connected sensor. In this further development, the operating parameters required for the communication with the fieldbus can therefore be transmitted to the active circuits of the connection module by the connected sensor. The user in this case therefore does not have to parameterize two devices, but it is sufficient to set the required operating parameters only at the sensor. The operating parameters are transmitted by this to the gateway circuit and to the I/O circuit of the connection module. The parameterization can thus take place—jointly for the sensor and the connection module—in a simple manner within the operating interface of the connected sensor.

The gateway circuit, including the I/O circuit, is preferably connected to the sensor interface such that the operating parameters are automatically read in at the sensor interface of the connection module at the start of operation—and in particular during a limited parameterization time interval after the start of operation. In other words, the gateway circuit and the I/O circuit are configured such that a data link between the sensor interface of the connection module and the connected sensor can be set up after the start of operation in order to transmit operating parameters from the sensor to the connection module. The decisive event for the transmission of the operating parameters can be the start of operation of the connection module and/or of the connected sensor; if both devices are not switched on simultaneously, the transmission in particular takes place on the start of operation of the device switched on later.

It is furthermore preferred for the connection module to be provided with a permanent memory, or with the already named permanent memory, in which the operating parameters received via the sensor interface can be stored. This permanent memory can be connected directly to the sensor interface or indirectly to the sensor interface via the gateway circuit and the I/O circuit.

In this process, the permanent memory can be configured such that those operating parameters stored in the permanent memory are transmitted from the permanent memory via the sensor interface to the connected sensor directly after the start of operation of the connection module and still before the transmission of operating parameters from the connected sensor. In this manner, the stored operating parameters can be transmitted indirectly from the permanent memory via the sensor interface and the connected sensor to the gateway circuit and to the I/O circuit. A direct connection between the permanent memory, on the one hand, and the gateway circuit and I/O circuit on the other hand can thereby be omitted.

In this further development, the gateway circuit and the I/O circuit can also be configured such that—if no operating parameters are received by the connected sensor after the start of operation—they use those operating parameters for the communication with the fieldbus which were previously stored in the permanent memory before the last start of operation of the connection module. If the connection module therefore exceptionally does not receive any operating parameters from a connected sensor after the start of operation, the connection module communicates with the fieldbus on the basis of the last received and stored operating parameters. It is thereby possible, for example, to replace a previously connected sensor with a simple switching unit or a simple actuator which are not made to initialize the connection module or the permanent memory with operating parameters. Nevertheless, such simple units can communicate with the fieldbus after replacement since the connection module now bases the communication on the previously transmitted and stored operating parameters.

The invention also relates to a method for the connection of a sensor, in particular of an optoelectronic sensor, to a fieldbus via a connection module in which a sensor connected to a connection module transmits operating parameters via a sensor interface to a gateway circuit of the connection module and in which the gateway circuit communicates with the fieldbus on the basis of the operating parameters transmitted by the sensor, with the connection module not necessarily having to be equipped with an I/O circuit.

This method makes it possible, in a similar manner as with the explained further development of the connection module, for the user generally not to have to parameterize the connection module and a sensor connected thereto separately. It is rather sufficient for the user to parameterize the connected sensor via the operating interface anyway provided, i.e. to provide the operating parameters required for the communication with the fieldbus. These operating parameters can then be transmitted by the sensor via the sensor interface of the connection module to the gateway circuit, including a possible I/O circuit of the connection module.

In this method, too, the said operating parameters can, for example, also be an identification number of the sensor within the network or the fieldbus system, a data length to be used or a baud rate to be used.

The operating parameters are preferably automatically transmitted from the connected sensor to the gateway circuit of the connection module at the start of operation of the connection module or of the sensor, with the gateway circuit in particular querying the sensor interface only during a limited parameterization time interval from the start of operation. The decisive event for the transmission of the operating parameters can here also be the start of operation of the connection module and/or of the connected sensor; if both devices are not switched on simultaneously, the transmission in particular takes place on the start of operation of the device switched on later.

It is preferred for the operating parameters transmitted by the sensor to be stored in a permanent memory of the connection module. It is possible in this case that those operating parameters already stored in the permanent memory of the connection module are transmitted from the permanent memory to the connected sensor directly after the start of operation of the connection module or of the sensor and still before the explained transmission of operating parameters by the sensor to the gateway circuit.

In an advantageous embodiment of this method, in the event that no operation parameters are received by the sensor at the sensor interface after a start of operation of the connection module, those operating parameters are used for the communication with the fieldbus which were already stored in the said permanent memory before the last start of operation of the connection module. In other words, the connection module uses the last received and stored operating parameters if no new operating parameters are received at the sensor interface after a new start. This can, for example, be the case if the previously connected sensor has in the meantime been replaced by a simple unit such as an I/O circuit or an actuator which does not permit any initialization of the connection module with operating parameters. In this case, the relevant unit can nevertheless be addressed via the fieldbus without any further parameterization measures since the connection module can make use of the last stored operating parameters.

Finally, it is also of advantage with the explained method for the operating parameters to be stored in a permanent memory of the connection module replaceably by the user. In this case the connection module used can be replaced without a reparameterization being necessary since the permanent memory can be replaced with the previously stored operating parameters and can thus be used in the new connection module.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
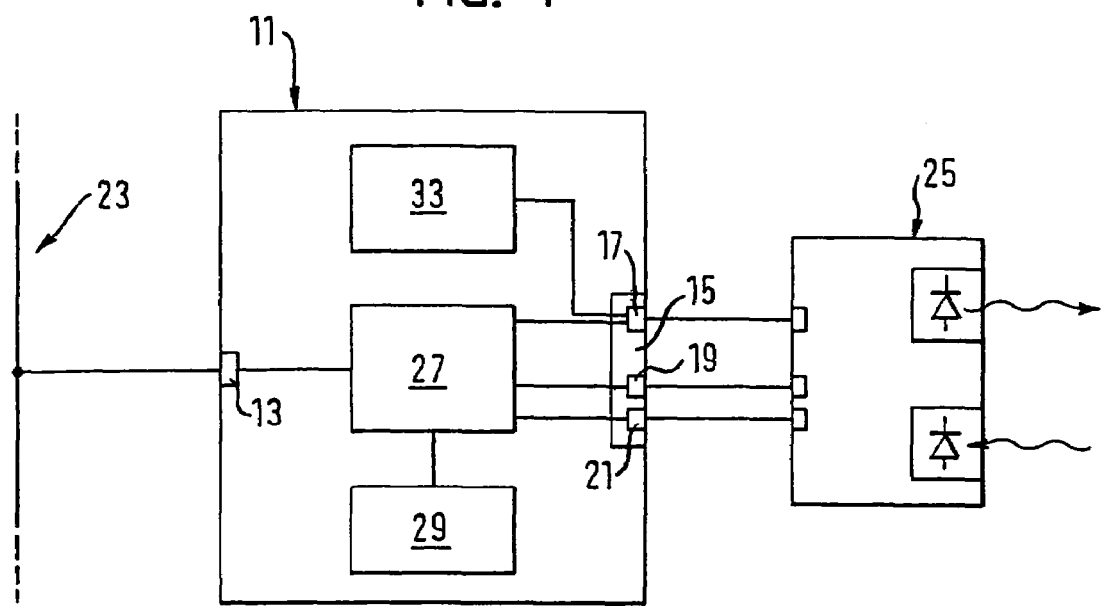
FIG. 1 schematically shows the design of a connection module connected to a fieldbus and to an optoelectronic sensor.

FIG. 1 shows, in a block diagram, a connection module 11 with a serial bus interface 13 and a parallel sensor interface 15. The latter has a serial data interface 17 and—parallel thereto—a switch input 19 and a switch output 21. The connection module 11 is connected to a fieldbus 23, for example of the type Profibus or DeviceNet, via the bus interface 13. Furthermore, the connection module 11 is connected via the serial data interface 17 and via the switch input 19 and the switch output 21 of the sensor interface 15 to an optoelectronic sensor 25, for example to an optical code reader.

The connection module 11 furthermore has a gateway circuit 27 which is connected to the bus interface 13 and to the serial data interface 17 of the sensor interface 15. The gateway circuit 27 serves for the conversion of the data exchanged between the bus interface 13 and the sensor interface 15 into the respective data format, as will be explained in the following.

An I/O circuit 29, which specifically serves for the conversion of the switching data or switching signals exchanged between the bus interface 13 and the switch input 19 and the switch output 21, as will likewise be explained below, is connected to the gateway circuit 27. The I/O circuit 29 is connected for this purpose indirectly via the gateway circuit 27 to the bus interface 13, on the one hand, and to the switch input 19 and the switch output 21 of the sensor interface 15, on the other hand.

The connection module 11 furthermore has an optional permanent memory 33 for the storage of operating parameters. The permanent memory 33 is connected to the serial data interface 17 of the sensor interface 15. Alternatively or additionally, the permanent memory 33 can, however, also be directly connected to the gateway circuit 27.

A plurality of I/O circuits in accordance with the number of circuit inputs/outputs 19, 21 can also be provided instead of a single I/O circuit 29.

The connection module 11 is furthermore provided with an energy supply not shown in FIG. 1, which can, for example, be a 24V power supply. The energy supply preferably jointly provides the connection module 11 and the optoelectronic sensor 25 with the required operating voltage so that the start of operation of these two devices generally also takes place simultaneously. The connection between the connection module 11 and the sensor 25 takes place via one single common cable harness.

Figure 2:
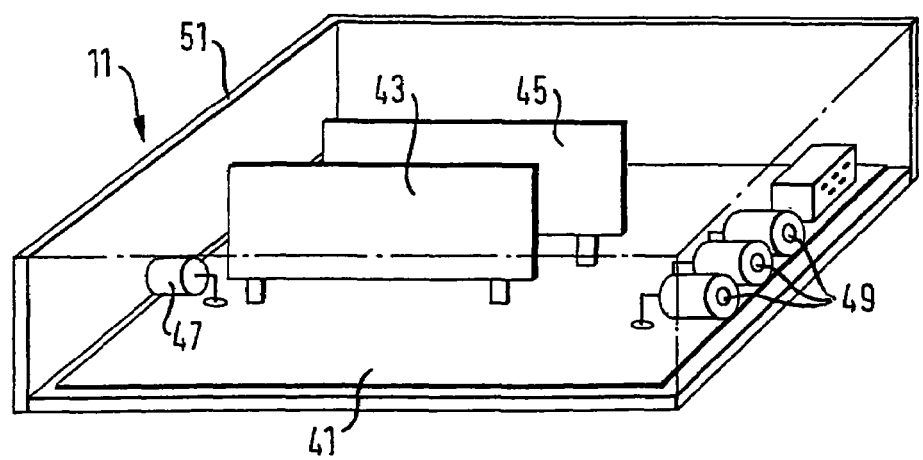
FIG. 2 shows this connection module in a perspective view.

FIG. 2 shows a possible embodiment of the connection module 11 in accordance with FIG. 1 in a schematic perspective view. Here, a passive motherboard 41 is provided at which a card 43 replaceable by the user is mounted which includes both the gateway switch 27 and the I/O circuit 29 in accordance with FIG. 1, including a micro-controller.

A further card 45 (insertable card) replaceable by the user is furthermore used at the motherboard 21 and carries the permanent memory 33 in accordance with FIG. 1 together with an associated micro-controller.

The motherboard 41 is furthermore provided with a serial plug connector 47, which serves as a bus interface 13 in accordance with FIG. 1, and with parallel clamp connectors 49, which serve as the serial data interface 17 or the switch input 19 and switch output 21 of the sensor interface 15 in accordance with FIG. 1.

The motherboard 41 connects the contacts for the gateway-I/O card 43, the contacts for the optional permanent memory card 45, the serial plug connector 47 and the parallel clamp connectors 49 via conductor tracks not shown in FIG. 2.

The motherboard 41, the gateway-I/O card 43, the permanent memory cad 45, the serial plug connector 47 and the parallel clamp connectors 49 are arranged within a common housing 51 which is open at the upper side and at the two sides facing the viewer in the view in accordance with FIG. 2.

The connection module 11 is thus a substantially passive module with an active gateway-I/O card 43 and an active permanent memory card 45.

The connection module 11 showed in FIGS. 1 and 2 serves for the connection of the sensor 25 to the fieldbus 23. The connection module 11 in this process serves, on the one hand, as an adapter between the serial interface of the sensor 25 and the serial interface of the fieldbus 23. On the other hand, a translation takes place within the connection module 11 of the data exchanged at the interface 15 with the sensor 25 into the format of the data exchanged at the bus interface 13, and vice versa. This mutual data conversion takes place in the gateway circuit 27.

Since a gateway circuit usually adapts a serial data interface (interface 17) to a bus system, in addition to the gateway circuit 27 at least one I/O circuit 29 is provided which is additionally integrated into the connection module 11. The I/O circuit 29 therefore permits the direct communication of the fieldbus 23 with the switch inputs/outputs of the sensor 25. In the embodiment in accordance with FIG. 1, the I/O circuit 29 communicates for this purpose indirectly via the gateway circuit 27 with the bus interface 13 and with the switch input 19 and the switch output 21, with a direct connection to the interfaces 13, 19, 21 alternatively also being able to be provided.

A particular advantage of the connection module 11 shown in FIGS. 1 and 2 lies in the fact that it permits a linking of the serial fieldbus 23 to the parallel interface of the sensor 25 due to the integrated I/O circuit 29 without further I/O modules being required in addition to the actual connection module 11 which have to be connected between the sensor 25 and the fieldbus 23. The I/O circuit 29 takes over the conversion inside the connection module 11 of the switching data received serially at the bus interface 13 into digital switching signals for the parallel switch inputs/outputs 19, 21, and vice versa.

The digital switching signals can thereby be controlled in a simple manner in the process mapping of the fieldbus 23 used without additional I/O modules being necessary which have to be separately parameterized for the specific fieldbus 23. The combination of sensor 25 and connection module 11 with a gateway circuit 27 and an I/O circuit 29 presents itself to the user as one single device, with both the sensor 25 and the gateway circuit 27 and the I/O circuit 29 being able to be jointly parameterized inside the operating interface of the sensor 25.

Since the gateway circuit 27 and the I/O circuit 29 are installed in the connection module 11 (card 43 in FIG. 2), a particularly short lead connection is possible to the parallel clamp connectors 49 and thus to the switch inputs/outputs of the sensor 25.

Since the gateway-I/O card 43 is replaceable without tools or at most with a simple tool, the connection module 11 can be simply adapted to different fieldbus systems and the related connection module 11 with the further components can be used flexibly for different fieldbus systems.

The optional permanent memory 33 permits the non-volatile storage of the operating parameters which permit the identification of the connected sensor 25 by the fieldbus 23 and fix the type of communication with the fieldbus 23. Since the connection module 11 is fitted with such a permanent memory 33, these operating parameters are also available after an intermediate deactivation of the connection module 11 so that no new parameterization is required after a switching off and a repeated switching on of the connection module 11. Since the permanent memory 33 is present in the form of the card 45 replaceable by the user, the connection module 11 can be replaced in a very simple manner in the event of a defect, for example, since the required operating parameters are maintained by taking over the permanent memory card 45 into the new connection module.

The parameterization of the gateway circuit 27 and of the I/O circuit 29 using the permanent memory 33 can take place in the following manner:

After a start of operation of the connection module 11—and due to the common voltage supply of the connected sensor 25, too—a connection is set up between the sensor 25 and the permanent memory 33 of the connection module 11 via the serial data interface 17 of the sensor interface 15 during a limited parameterization time interval. In this process, the sensor 25 recognizes whether it is connected to a connection module 11 and whether a permanent memory 33 with valid operating parameters is present. In the applicable case, the sensor 25 reads the operating parameters from the permanent memory 33 via the sensor interface 15 and transmits the operating parameters—again via the sensor interface 15—to the gateway circuit 27, including the I/O circuit 29. In this process, a check, an additional storage and/or a supplementation of the operating parameters can take place inside the sensor 25 in the meantime.

If the sensor 25, in contrast, does not receive any operating parameters from the permanent memory 33 despite its connection to it—for example on the basis of a defect of the permanent memory 33—it transmits those operating parameters to the gateway circuit 27, including the I/O circuit 29, which the sensor 25 has stored in its own non-volatile memory.

If, vice versa, the gateway circuit 27 of the connection module 11 does not receive any operating data at the serial data interface 17 from the sensor 25 during the parameterization time interval after a start of operation, it reads the last stored and used operating parameters from the permanent memory 33 and uses them for the communication with the fieldbus 23.

In view of this automatic parameterization of the gateway circuit 27, including the I/O circuit 29, the user does not have to parameterize two or more devices separately in order to configure the system for the connection to the fieldbus 23. It is instead sufficient for the user only to initialize the sensor 25 with the operating parameters inside its operating interface. In the event of a replacement of the sensor 25, no new parameterization is likewise necessary, since the operating parameters previously transmitted to the gateway circuit 27 of the connection module 11 and stored in the permanent memory 33 there can continue to be used.

Even if the connection module 11 does not have any permanent memory 33, it is possible for the operating parameters stored in the sensor 25 to be transmitted automatically from the connected sensor 25 via the serial data interface 17 of the sensor interface 15 to the gateway circuit 27 and, optionally, to the I/O circuit 29 after a restart of the system, preferably only during a limited parameterization time interval. The advantage also hereby results in this case that the user does not have to parameterize both the sensor 25 and the gateway circuit 27 of the connection module 11 separately.

The description of the invention is merely exemplary in nature and, thus, variations that do not depart from the gist of the invention are intended to be within the scope of the invention. Such variations are not to be regarded as a departure from the spirit and scope of the invention.

REFERENCE NUMERAL LIST 11 connection module
13 bus interface
15 sensor interface
17 serial data interface
19 switch input
21 switch output
23 fieldbus
25 optoelectronic sensor
27 gateway circuit
29 I/O circuit
33 permanent memory
41 motherboard
43 Gateway-I/O card
45 permanent memory card
47 serial plug connector
49 parallel clamp connector
51 housing

What is claimed is:

1. A connection module (11) for the connection of a sensor, in particular of an optoelectronic sensor (25), to a fieldbus (23), comprising:
a sensor interface (15, 49) for the connection of the connection module to an interface of a sensor;
a serial bus interface (13, 47) for the connection of the connection module to an interface of a fieldbus; and
a gateway circuit (27, 43), which is connected to the bus interface and to the sensor interface to convert data received at the bus interface into a data format of a connected sensor and to output them at the sensor interface and to convert data received at the sensor interface into a data format of the fieldbus and to output them at the bus interface, wherein the sensor interface (15, 49) of the connection module (11) is made as a parallel interface with a serial data interface (17) and with at least one separate switch input/output (19, 21) parallel thereto; and
at least one I/O circuit (29, 43) is integrated into the connection module (11) and is connected to the bus interface and to the sensor interface to convert switching data serially received at the bus interface into switching signals and to output them at the switch input/output of the sensor interface and to convert switching signals received in parallel at the switch input/output of the sensor interface into switching data and to output them serially at the bus interface.

2. A connection module in accordance with claim 1, characterized in that the I/O circuit (29) is integrated into the gateway circuit (27, 43).

3. A connection module in accordance with claim 1, characterized in that the gateway circuit (27, 43) is made as a unit replaceable by the user, in particular a card.

4. A connection module in accordance with claim 1, characterized in that the sensor interface (15, 49), the bus interface (13, 47), the gateway circuit (27, 43) and the I/O circuit (29, 43) are arranged in a common housing (51).

5. A connection module in accordance with claim 1, characterized in that a permanent memory (33, 45) is furthermore integrated into the connection module (11) for the storage of operating parameters for the communication of the gateway circuit (27, 43) and of the I/O circuit (29, 43) with the fieldbus (23).

6. A connection module in accordance with claim 5, characterized in that the permanent memory (33, 45) is made as a unit replaceable by the user.

7. A connection module in accordance with claim 5, characterized in that the operating parameters are identification numbers, data lengths or baud rates for the fieldbus.

8. A connection module in accordance with claim 1, characterized in that the gateway circuit (27, 43) and the I/O circuit (29, 43) are configured such that operating parameters for the communication with the fieldbus (23) can be communicated to the gateway circuit (27, 43) and to the I/O circuit (29, 43) from a connected sensor (25) via the sensor interface (15).

9. A connection module in accordance with claim 8, characterized in that the gateway circuit (27, 43) and the I/O circuit (29, 43) are configured such that the operating parameters can be transmitted at the start of operation of the connection module (11) or of the connected sensor (25).

10. A connection module in accordance with claim 9, characterized in that the gateway circuit (27, 43) and the I/O circuit (29, 43) are configured such that the operating parameters can be transmitted at the start of operation of the connection module (11) or of the connected sensor (25) during a limited parameterization time interval.

11. A connection module in accordance with claim 8, characterized in that the connection module (11) is provided with a permanent memory (33, 45) in which the operating parameters transmitted via the sensor interface (15) can be stored, wherein the permanent memory (33, 45) is connected directly to the sensor interface (15) or indirectly to the sensor interface (15) via the gateway circuit (27, 43) and the I/O circuit (29, 43).

12. A connection module in accordance with claim 11, characterized in that the permanent memory (33, 45) is configured such that operating parameters stored in the permanent memory (33, 45) can be transmitted from the permanent memory (33, 45) via the sensor interface (15) to the connected sensor (25) directly after the start of operation of the connection module (11) or of the connected sensor (25) and still before a transmission of operating parameters from the connected sensor (25).

13. A connection module in accordance with claim 11, characterized in that the gateway circuit (27, 43) and the I/O circuit (29, 43) are configured such that, if no operating parameters are transmitted from the connected sensor (25) to the gateway circuit (27, 43) and to the I/O circuit (29, 43) after a start of operation of the connection module (11) or of the connected sensor (25), they use those operating parameters for the communication with the fieldbus (23) which are stored in the permanent memory (33, 45).

14. a method for the connection of a sensor, in particular an optoelectric sensor (25), via a connection module (11) to a fieldbus (23);
    a sensor (25) connected to a connection module (11) transmits operating parameters to a gateway circuit (27,43) of the connection module (11) via a sensor interface (15) of the connection module; and in that the gateway circuit (27, 43) communicates with the fieldbus (23) via a serial bus interface (13) on the basis of the operating parameters transmitted by the sensor (25), where the sensor interface (15, 49) of the connection module (11) is made as a parallel interface with a serial data interface (17) and with at least one separate switch input/output (19, 21) parallel thereto: and at least one I/O circuit (29, 43) is integrated into the connection module (11) and is connected to the bus interface and to the sensor interface to convert switching data serially received at the bus interface into switching signals and to output them at the switch input/output of the sensor interface and to convert switching signals received in parallel at the switch input/output of the sensor interface into switching data and to output them serially at the bus interface.

15. A method in accordance with claim 14, characterized in that the sensor (25) transmits the operating parameters to the gateway circuit (27, 43) at the start of operation of the connection module (11) or of the sensor (25).

16. A method in accordance with claim 15, characterized in that the sensor (25) transmits the operating parameters to the gateway circuit (27, 43) at the start of operation of the connection module (11) or of the sensor (25) during a limited parameterization time interval.

17. A method in accordance with claim 14, characterized in that the operating parameters transmitted by the sensor (25) are stored in a permanent memory (33, 45) of the connection module.

18. A method in accordance with claim 17, characterized in that operating parameters stored in the permanent memory (33, 45) of the connection module are transmitted from the permanent memory (33, 45) to the sensor (25) directly after the start of operation of the connection module (11) or of the sensor (25) and still before a transmission of operating parameters by the sensor (25) to the gateway circuit (27, 43).

19. A method in accordance with claim 17, characterized in that, in the event that no operating parameters are transmitted from the sensor (25) to the gateway circuit (27, 43) after a start of operation of the connection module (11) or of the sensor (25), the gateway circuit (27, 43) communicates with the fieldbus (23) on the basis of those operating parameters which are stored in the permanent memory (33, 45).

20. A method in accordance with claim 14, characterized in that the operating parameters are stored in a permanent memory (33, 45) of the connection module (11) replaceable by the user.

21. A method in accordance with claim 14, characterized in that the operating parameters are identification numbers, data lengths or baud rates for the fieldbus.

* * * * *